July 7, 1970   J. P. GNAEDINGER ET AL   3,518,834
GROUTING SYSTEM
Filed May 9, 1968   2 Sheets-Sheet 1

INVENTORS
John P. Gnaedinger
Alvaro L. Ruiz
by McDougall, Hersh, Scott
and Ladd
Attys July 7, 1970  J. P. GNAEDINGER ET AL  3,518,834
GROUTING SYSTEM Filed May 9, 1968  2 Sheets-Sheet 2

United States Patent Office 3,518,834
Patented July 7, 1970

3,518,834
GROUTING SYSTEM
John P. Gnaedinger, Highland Park, Ill., and Alvaro L. Ruiz, Madrid, Spain, assignors to Soil Testing Services, Inc., Northbrook, Ill., a corporation of Illinois
Filed May 9, 1968, Ser. No. 728,007
Int. Cl. E02d 3/12; E01g 3/00
U.S. Cl. 61—36                                3 Claims

ABSTRACT OF THE DISCLOSURE

A construction and method for introducing grouting materials into the soil comprising an elongated pipe having means attached thereto which result in uniform introduction of the grouting composition and which prevent passage of the composition out of the bore formed for grouting purposes. A porous bag may be attached to the pipe whereby the grouting composition will seep through openings in the bag for uniform flow into the surrounding soil. A further feature of the invention involves the use of an inflatable packing means designed to seal the bore to prevent movement of grouting composition out of the bore after it has been introduced but before the composition has an opportunity to pass into the surrounding soil.

---

This invention relates to a grouting system particularly including novel constructions and methods for introducing grouting materials into the soil.

Grouting compositions are extensively used for a variety of reasons. The instant invention is concerned primarily with the use of grouting compositions for purposes of facilitating excavations. In such operations, bores are formed in the soil for the introduction of grouting compositions into the areas which surround the area to be excavated. When the grouting compositions react within the soil, the soil will be hardened to thereby minimize the possibility of soil movement when the excavation is made. Grouting compositions may be used for a wide variety of excavations or in other applications; however, for purposes of illustrating the invention, reference will be made to the use of the compositions in conjunction with the formation of tunnels.

One problem encountered when introducing grouting compositions involves the tendency of the grouting materials to flow out from the bores which are dug in the soil. For example, in the case of a vertical bore, the grouting composition may fill the bore and spill over the top before it has a chance to seep into the surrounding soil. This is particularly true where relatively high pressure is employed for introducing the grouting compositions. If the pressure is reduced, the chances of providing effective and uniform seepage into the surrounding soil are also reduced.

It is a general object of this invention to provide an improved arrangement for achieving the introduction of grouting compositions into the soil whereby effective use of the compositions can be achieved.

It is a more specific object of this invention to provide a construction and method which will permit introduction of grouting compositions into the soil under high pressure without encountering the back-up or spill-over of the compositions, and while achieving uniquely uniform penetration of the grouting compositions into the soil.

These and other objects of this invention will appear hereinafter, and for purposes of illustration, but not of limitation, specific embodiments of the invention are shown in the accompanying drawings in which.

The system of this invention generally involves the use of an elongated pipe for transporting grouting composition. In one form of the invention, a porous bag is fit around the pipe in surrounding relationship with respect to openings formed in the pipe. The assembly comprising the pipe and bag is introduced into a bore whereby grouting compositions can be brought into contact with the soil surrounding the bore. By introducing the grouting composition into the pipe and then out into contact with the porous bag, and by using bags with a permeability close to that of the finer portion of the soil strata to be grouted, a very uniform distribution of the grouting composition can be achieved. Thus, the grouting composition will pass outwardly through the small openings of the porous bag for contact with the soil.

The invention also provides for sealing means which will prevent passage of the grouting composition outwardly from the bore. When sealing means are employed in the manner to be described, the grouting composition can be introduced into the bag under high pressure, and this will facilitate rapid and deep penetration of the grouting composition into the surrounding soil. The sealing means will avoid the possibility of the grouting composition moving through the bore instead of penetrating the soil.

Figure 1:
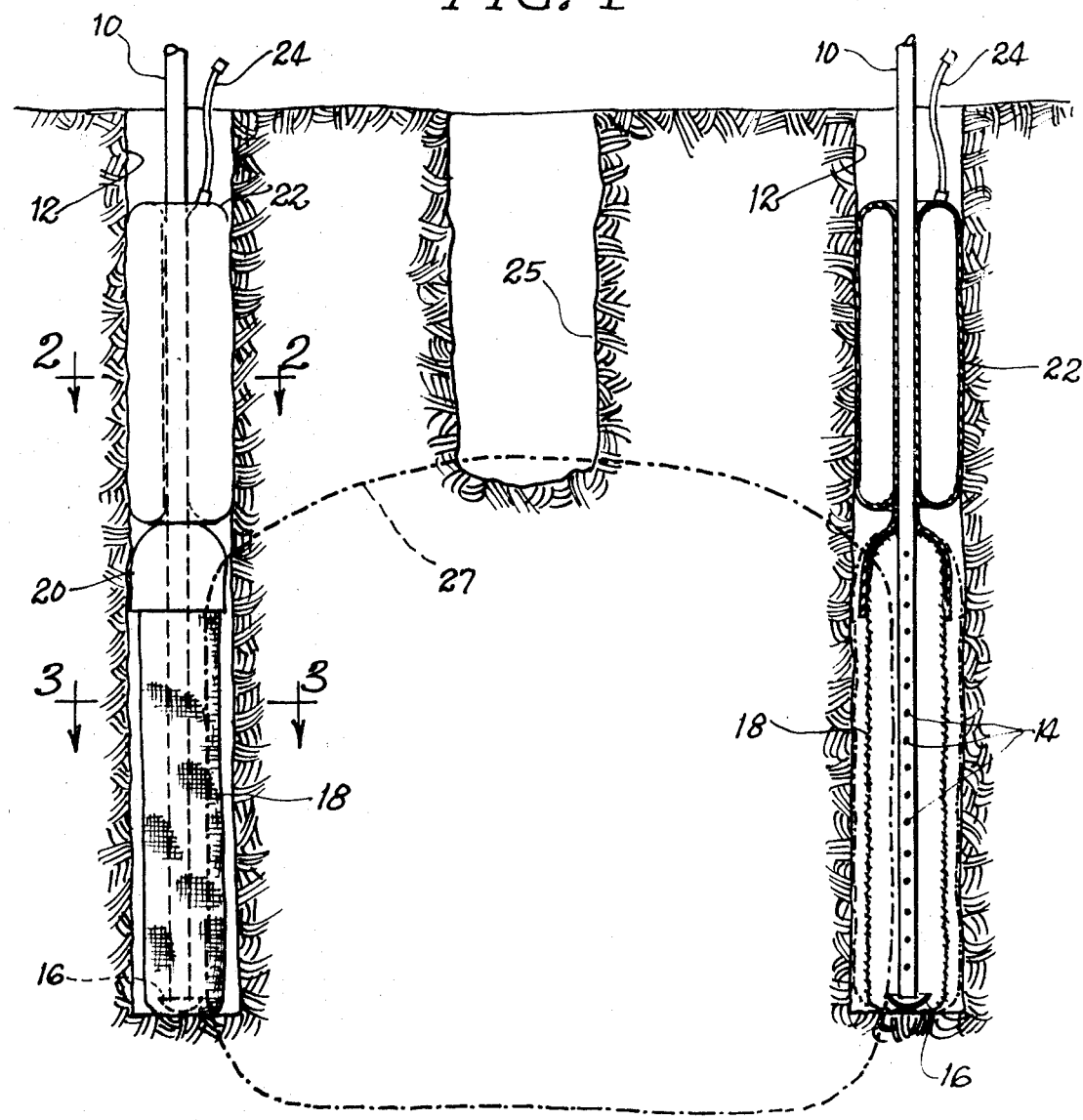
FIG. 1 is an elevational view, in section, illustrating constructions of this invention inserted in bores formed for achieving the introduction of grouting compositions into the soil.
Figure 2:
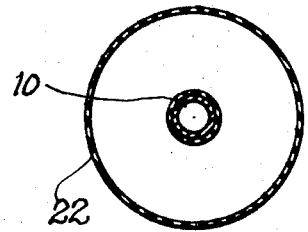
FIG. 2 is a cross-sectional view taken about the line 2—2 of FIG. 1.
Figure 3:
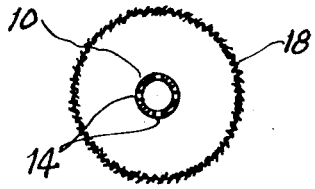
FIG. 3 is a cross-sectional view taken about the line 3—3 of FIG. 1.

FIG. 1 illustrates a pair of constructions, each including a pipe 10 which is provided for passing grouting material into the bores 12. Openings 14 are provided at the lower end of the pipe whereby grouting compositions introduced into the pipe will be free to pass outwardly. A deflector element 16 may be provided at the lower end of each pipe for the discharge of grouting composition at this point.

Each of the pipes carries a porous bag 18, and this bag extends along that part of the pipe which defines the openings 14. Accordingly, grouting composition which passes out of the openings 14 will fill the bag 18.

The bag 18 is preferably a fabric bag having numerous small openings whereby the grouting composition will pass into contact with the soil at numerous locations. A typical material suitable for use as the fabric bag comprises Du Pont type 702 nylon having a tensile strength of 277 pounds per lineal inch, 200 pounds per inch parallel to the fill, and having a 22 x 22 weave. As indicated, the permeability of the bag should be of approximately the same value as that of the finer portion of the soil and, accordingly, a variety of different bag materials can be employed.

In an operation involving use of the techniques described, a fabric bag was made by cutting a strip of fabric 9.5 meters long and 0.33 meter wide. The edges of the bag were sewed together to provide a tubular construction. In cutting the fabric, it is preferred that the fill filaments extend the length of the bag while the warp filaments extend transversely of the bag.

A one-inch I.D. steel pipe 10 meters long was placed inside the bag. The pipe was provided with small holes drilled at 25-centimeter intervals at the bottom three meters of the pipe. The bag and pipe were placed inside a casing of an Atlas-Copco wagon drill that had been utilized in providing a bore in soil to be grouted. After the bag and pipe were in place, the casing was withdrawn, and using standard techniques for introducing the grouting material, it was found that highly effective grouting results could be obtained with the construction employed.

When grouting composition is introduced into the fabric bag, the composition will penetrate the soil as it issues from the bag. In this connection, the bag will expand as illustrated by the dotted lines at the right side of FIG. 1 to assume the contours of the bore. Again, the chances of uniform penetration are greatly increased because of this characteristic of the bag.

It is possible, however, for some grouting composition to attempt passage out of the bore, particularly where the pressure of introduction is high and where the soil is not too easily penetrated. To avoid the possibility of less of grouting composition, the bag may be provided with an impervious collar 20 as shown at the left side of FIG. 1. When the bag expands upon introduction of grouting composition, this flexible collar, which may be formed of rubber, will press against the sides of the bore and thereby seal the bore to prevent loss of the grouting composition.

The collar 20 may be used alone, however, FIG. 1 also illustrates a packing means 22 which serves as a sealing device to be used alone or in combination with the collar. This packing means comprises an inflatable tubular element with the central opening of this element receiving the pipe 10. The tube 22 may be attached to the pipe at the same time as the bag 18, and the tube can then be inflated to provide a highly effective seal. The tube is preferably elongated as shown to provide maximum protection against passage of the grouting composition out of the bore. A valve structure 24 is provided for inflating of the tube.

FIG. 1 illustrates an additional bore 25 which can be formed to achieve grouting particularly where the excavation is for a tunnel as suggested by the dotted line 27. Obviously, any number of bores can be formed depending upon the nature of the soil and the degree of support desired.

Figure 5:
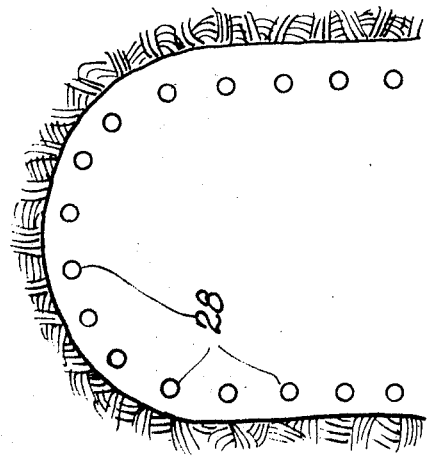
FIG. 5 is a schematic illustration of an additional arrangement suitable for tunnel excavation; and, FIG. 6 is a cross-sectional view illustrating a modified form of the invention.
Figure 4:
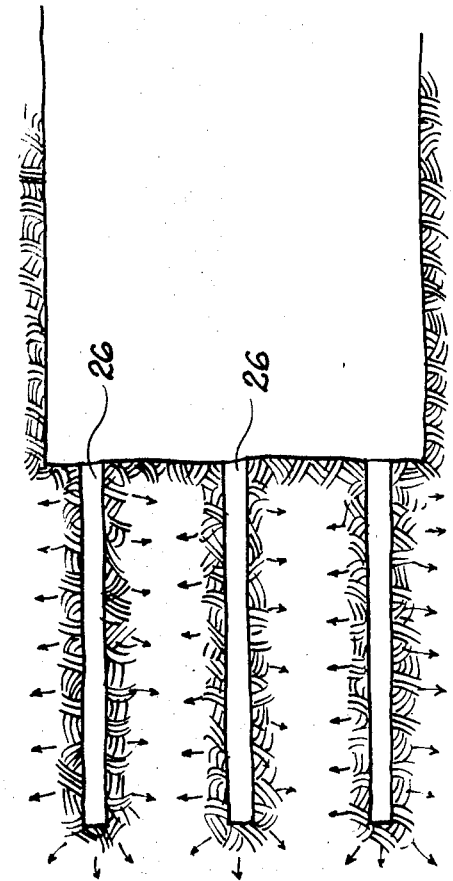
FIG. 4 is a schematic illustration of bores formed horizontally to provide for grouting during tunnel excavation.

FIGS. 4 and 5 illustrate the manner in which the system of the invention can be employed in the excavation of tunnels. Bores, such as shown at 26 in FIG. 4 or 28 in FIG. 5, are formed in the vertical face at the end of the tunnel. Some of the bores may extend at an angle outwardly to insure that the material which will form the walls of the excavation is properly grouted. At any rate, the system of this invention, particularly including the sealing means described is ideally suited for the excavation of tunnels wherein horizontal bores are formed for grouting purposes. Thus, high pressure can be employed for introducing the grout and uniform grouting of the soils can be accomplished where the fabric bag and associated sealing means are utilized since the horizontal disposition of these elements does not affect their operation.

Figure 6:
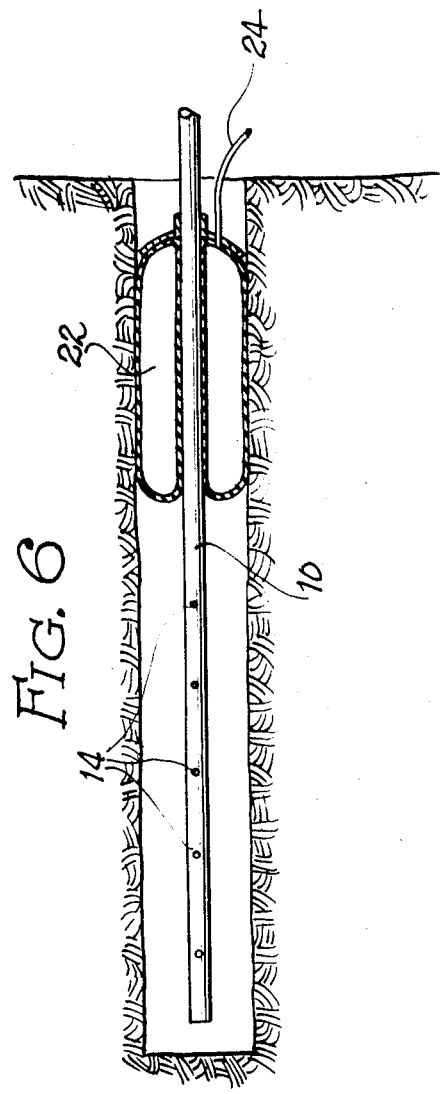

FIG. 6 illustrates an alternative form of the invention wherein the inflatable tube 22 is utilized without the fabric bag 18. This arrangement is suitable for use in some situations depending upon soil characteristics. Thus, the inflatable tube 22 represents a highly unique arrangement which provides distinct improvements when compared with arrangements employed by the prior art.

Where the fabric bag 18, is employed, it may serve a dual function. Specifically, the bores are usually formed by means of a drill which extends within a metal casing. As the drill proceeds in the formation of the bore, the casing is moved along to act as a supporting member for the walls formed by the drill. After the bore has been formed to the proper depth, the drill is removed; however, the casing remains in place. At this time, the assembly comprising the fabric bag and pipe may be inserted into the casing, and grouting material can be immediately introduced to provide for expansion of the fabric bag. If the casing is now withdrawn, the fabric bag will act as a supporting member, thus preventing collapse of the loose soil forming the walls of the bore. This feature of the instant invention is extremely important in areas where the soil has little or no self-sustaining ability.

The system of the instant invention provides other advantages over systems of the prior art. It has been found, for example, that the system of this invention is much faster from the standpoint of grouting time due to the more uniform introduction and because there is a minimum chance of the walls of a bore collapsing and thereby delaying the following operations. The elements of the construction are not unduly expensive and can actually be left in the bore after the completion of grouting without materially affecting the cost of the operation.

It will be understood that various changes and modifications may be made in the above described construction which provide the characteristics of this invention without departing from the spirit thereof particularly as defined in the following claims.

We claim:
1. A construction for introducing grouting materials into the soil comprising an elongated pipe, means for inserting said pipe into a bore formed in said soil, openings defined by said pipe for discharge of the grouting composition whereby the composition can be introduced through the pipe and then out through said openings, a porous bag fit around said pipe in surrounding relationship with respect to said openings whereby said composition passes through the bag and then flows into the soil, and means for sealing said bore to prevent passage of the composition out of the bore after the composition passes through the bag, said sealing means for sealing the bore comprising an impervious collar attached to the upper end of the bag, said collar being formed of flexible material whereby the collar will move into contact with the inner surface of the bore in response to expansion of the bag upon introduction of the grouting composition, said collar thereby conforming to the surface of the bore to prevent passage of the grouting composition.

2. A construction in accordance with claim 1 including an expandable member fit around said pipe beyond the end of said bag, and including means for expanding said member to provide an interfitting relationship between the member and the interior surface of the bore whereby movement of the composition out of the bore is prevented.

3. A construction in accordance with claim 2 wherein said expandable member is in the form of a tube with the central opening of the tube receiving said pipe, and including means for inflating the tube with air to achieve a sealing relationship.

References Cited

UNITED STATES PATENTS

| 2,363,018 | 11/1944 | Poulter | 61—36 X |
| 3,099,911 | 8/1963 | Turzillo | 61—35 |
| 3,392,785 | 7/1968 | King | 166—187 |
| 1,883,622 | 10/1932 | Donaldson | 61—42 |
| 3,260,054 | 7/1966 | Lorenz | 61—42 |
| 3,365,894 | 1/1968 | Murati | 61—53.6 |

FOREIGN PATENTS

| 256,105 | 1/1965 | Australia. |
| 91,457 | 2/1923 | Austria. |
| 588,407 | 11/1933 | Germany. |

JACOB SHAPIRO, Primary Examiner

U.S. Cl. X.R.

61—40, 42, 53.6, 63